(12) United States Patent
Givargizov et al.

(10) Patent No.: US 7,161,148 B1
(45) Date of Patent: Jan. 9, 2007

(54) TIP STRUCTURES, DEVICES ON THEIR BASIS, AND METHODS FOR THEIR PREPARATION

(75) Inventors: Evgeny Invievich Givargizov, Moscow (RU); Michail Evgenievich Givargizov, Moscow (RU)

(73) Assignee: Crystals and Technologies, Ltd., Moscow (RU)

( * ) Notice: Subject to any disclaimer, the term of this patent is extended or adjusted under 35 U.S.C. 154(b) by 0 days.

(21) Appl. No.: 09/980,432

(22) PCT Filed: May 31, 2000

(86) PCT No.: PCT/RU00/00209
§ 371 (c)(1),
(2), (4) Date: Jun. 11, 2002

(87) PCT Pub. No.: WO00/74107
PCT Pub. Date: Dec. 7, 2000

(30) Foreign Application Priority Data

| May 31, 1999 | (RU) | ............................................. | 99111382 |
| May 31, 1999 | (RU) | ............................................. | 99111432 |
| Mar. 23, 2000 | (RU) | ......................................... | 2000107025 |
| Mar. 23, 2000 | (RU) | ......................................... | 2000107026 |

(51) Int. Cl.
*C30B 25/18* (2006.01)

(52) U.S. Cl. ............................ 250/306; 117/90; 117/94; 117/101

(58) Field of Classification Search ................. 250/306, 250/307; 438/20; 445/49–51; 117/101, 90, 117/94, 97, 106, 921, 902, 935
See application file for complete search history.

(56) References Cited

U.S. PATENT DOCUMENTS

| 5,294,465 | A | * | 3/1994 | Gallagher | ..................... 427/523 |
| 5,742,377 | A |   | 4/1998 | Minne et al. | |
| 5,780,318 | A | * | 7/1998 | Hirano et al. | ................... 438/20 |
| 5,825,122 | A |   | 10/1998 | Givargizov et al. | |
| 6,017,772 | A | * | 1/2000 | Derraa | ......................... 438/20 |
| 6,113,451 | A | * | 9/2000 | Hobart et al. | ................... 445/50 |
| 6,306,734 | B1 |   | 10/2001 | Givargizov | |
| 6,458,206 | B1 | * | 10/2002 | Givargizov et al. | .......... 117/101 |

FOREIGN PATENT DOCUMENTS

| WO | WO 96/42101 | 12/1996 |
| WO | WO 99/58925 | 11/1999 |

OTHER PUBLICATIONS

C.A. Spindt, et al., *Physical properties of thin–film field emission cathodes with molybdenum cones*, J. Appl. Phys., 47, pp. 5248–5263 (1976).

(Continued)

*Primary Examiner*—Kiet T. Nguyen
(74) *Attorney, Agent, or Firm*—Knobbe Martens Olson & Bear LLP

(57) ABSTRACT

New designs of electron devices such as scanning probes and field emitters based on tip structures are proposed. The tips are prepared from whiskers that are grown from the vapor phase by the vapor-liquid-solid technology. Some new designs for preparation of field-emitters and of probes for magnetic, electrostatic, morphological, etc, investigations based on the specific technology are proposed. New designs for preparation of multilever probes are proposed, too.

27 Claims, 15 Drawing Sheets

OTHER PUBLICATIONS

P. Grütter et al., *Batch fabricated sensors for magnetic force microscopy*, Appl. Phys. Lett. 57, pp. 1820–1822 (1990).

D.W. Abraham, et al., *Lateral dopant profiling in semiconductors by force microscopy using capacitive detection*, J. Vac. Sci. Technol., B9, pp. 703–706 (1991).

K.L. Lee et al., *Submicron Si trench profiling with an electron–beam fabricated atomic force microscope tip*, J. Vac. Sci. Technol., B9, pp. 3352–3568 (1991).

E.I. Givargizov, *Ultrasharp tips for field emission applications prepared by the vapor–liquid–solid growth technique*, J. Vac. Sci. Technol., B11, 449–453 (1993).

C.D. Frisbie, et al., *Functional group imaging by chemical force microscopy*, Science, 265, pp. 2071–2074 (1994).

V.A. Bykov, et al., *New devices and possibilities in a scanning probe microscopy*, in: Proc. Russian 1999 Conf. On SPM, Nizhnii Novgorod, pp. 132–133 (Mar. 1999).

J. Browning, *Field emission display development and testing*, Proc. Of the 8$^{th}$ Intern. Conf. On Vacuum Microelectronics (Portland, USA), pp. 1–8 (1995).

Y. Huang, et al., *Quantitative two–dimensional dopant profiling of abrupt dopant profiles by cross–sectional scanning capacitance microscopy*, J. Vac. Sci. Technol. A14, pp. 1168–1171 (1996).

J.H. Hafner, et al., *Growth of nanotubes for probe microscopy tips*, Nature 398, pp. 761–761 (1999).

P. Leinenbach, et al., *Fabrication and characterization of advanced probes for magnetic force microscopy*, Appl. Surf. Sci., 144–145, pp. 492–496 (1999).

L. Abelman, et al., *Analysis of the limit of resolution in magnetic force microscopy using EBID tips*, a paper presented to Intern. STM Conf., Seoul, Korea, Ext. Abstr., pp. 477–478 (1999).

V.V. Dremov, et al., *An alternative working mode of SPM at surface investigations*, in: Proc. Russian 1999 Conf. On SPM, Nizhii Novgorod, pp. 404–410 (Mar. 1999).

E.I. Givargizo, et al., *Whisker proves*, Ultramicroscopy 82, pp. 57–61 (2000).

\* cited by examiner

TIP STRUCTURES, DEVICES ON THEIR BASIS, AND METHODS FOR THEIR PREPARATION

FIELD OF THE INVENTION

The invention relates to materials sciences, especially to electronic materials sciences, in particular to microelectronics, especially to mission electronics, to precision instruments for scientific and technological research. More specifically, this invention relates to design and to methods for preparation of electron emissive devices and of scanning probe devices. This invention can also be used in lithographic processes, as well as in basic processes of micro- and nanoelectronics.

DESCRIPTION OF THE RELATED ART

Electron emissive devices (EEDs) represent the devices generate flows of electrons in a vacuum for various purposes: for optical imaging, for electron-beam lithography, for lighting, etc. A cathode (an emitter) bearing the flows of electrons represents a principal component of the devices. Thermal cathodes heated to high temperatures serve as a classic example of such devices. However, the thermal cathodes consume a lot of energy for their operation. In this respect, field emission cathodes (or "cold cathodes") are far more effective devices. So-called Spindt cathodes based on molybdenum tips could serve as an example of the field emission devices. Devices based on semiconductor (silicon) field emitters are more suitable for applications because the materials and their technology is less expensive.

Field emission devices based on silicon tips prepared from silicon whiskers (filamentary crystals) are known in the art. In particular, a device that uses the resistance of the silicon emitter itself as a ballast resistance, that is important for field-emission displays (FED), has been realized. In addition, the emitter was coated by diamond for increasing of the emission ability and of its durability. This allows to increase the efficiency of the emission owing to the increase of number of emitters having the same spatial coordinate. Accordingly, a given pixcell can increase the emissivity brightness several times.

Carbon nanotubes on flat substrates used in the field emitters are known. However, parameters of such emitters are not reproducible because distributions of electric fields between the nanotubes are non-uniform due to their occasional positions.

Scanning probe microscopes (SPM) are able to provide images of solid surfaces with high spatial resolutions. Using carbon nanotubes attached to the probes is known. However, their position at the probe is non-controllable due to their occasional and numerous nucleations.

The SPM can be used for study of magnetic objects with a high resolution and high sensitivity. Probe tips for the instruments are made of a non-magnetic material (such as silicon) coated by a film of magnetic material (such as iron, cobalt, etc). However, both a shape and a structure of the coatings arc nonoptimal for the high resolution and the high sensitivity of the instruments.

The SPM for electrical capacitance measurements uses probes that have silicon tips. However, both a shape of the tips and a composition of the capacitance material are not optimal for high sensitivity of the instrument.

SPM probes with side tips for profile studies are known. However, the probes are suitable only for studies of surfaces having rather simple forms such as grooves with vertical walls. However, there are a lot of cases where surfaces with complicated shapes (such as biological macromolecules) or with a coarse relief must be studied.

There are problems with mapping the spatial arrangement of chemical forces existing on solid surfaces.

Problems with ensuring high scanning rates in SPM devices having a single lever/probe are known. Due to the small scanning rate, such devices are not broadly used in the industry.

A multi-lever device has been proposed. In the device, a signal from each probe is treated in a microchip that is placed on a holder. After treating the signal, it is applied to a system for controlling a variety of levers. In this operation, piezoresistive layers are used. Drawbacks of the multi-lever device include the following:

1. In order to realize both feeding/taking-off the levers and tracing their deflections, using only the piezoresistive layers is not sufficient.

2. Creation/production of the multilever devices integrated with multiplexers, operational amplifiers, etc (that is necessary for an effective action of the multi-lever devices) represents a very complicated and expensive technological problem.

A cantilever for a SPM, as well as techniques for a registration and for treatments of signals obtained, are known. In particular, a device is proposed that is based on a measurement of change of the capacity between the lever and neighboring stationary plane. The device includes also a controlled action to the lever by an electrostatic interaction between the stationary plane and the lever (Fig.). In this case, three principal tasks are solved:

application of resonance modes to the lever when it acts in the taping mode;

electrostatic feeding/taking-off the lever;

control of the lever deflection by the measurement of the capacity.

However, sometimes, especially at the action of the SPM in the regime of the claim scanning of adhesion forces, an ability of the device to ensure a fast damping of non-resonant oscillations, to damp the lever for its subsequent interaction with solid surface under study is very important. Such a property of the device, as well as a suitable design of the cantilever, can substantially (3–5 times) decrease the time of investigation of the surface.

In order to realize such a property, it is proposed to use an actuator-a part of the cantilever that is rigidly connected with its holder. When the probe is detached off the surface (where it was, e.g., "captured" by the adhesion forces), non-resonant oscillations of the lever arise. By measurements of changes of the capacity, existing between the lever and the actuator, the oscillations are applied to the input of the system that has a negative feed-back: a similar (by amplitude) and an opposite (in sign) signal is applied to the actuator. This results in the nonresonant damping of the lever oscillations and, finally, in its relaxation.

Thus in this invention, in addition to the approaches developed in the patent [14], we propose an approach that ensures a stable and fast action of the scanning probe device in any regimes of its work.

To this aim, we propose to provide the cantilever with second electrode that applies the resonant modes of oscilations to the lever.

In this invention, a rational design of the multi-lever and a non-expensive technology for its production is proposed.

SUMMARY OF CERTIAN INVENTIVE ASPECTS

Thus, there is a need for a scanning probe device that ensures a stable and fast action in any regimes of its work.

In a preferred embodiment, the scanning probe device has a cantilever with a second electrode that applies the resonant modes of oscillations to the lever. This provides an advantageous design of the multi-lever and a non-expensive technology for its production. In a preferred embodiment, components of scanning probe devices (SPD) such as levers, probes on them, can be fractionized and separated from each of other by using a new technology for preparation of tip probes. It is possible to form multifunctional tip structures that allow to combine in a given device, a multilever, several probes with various sensitive components for simultaneous implementation of morphological, electrostatic, magnetic, and chemical investigations.

A tip structure that includes a single-crystalline substrate and a single-crystalline tip crystalline tip epitaxial to the substrate, so that the axis of the tip forms a given angle in respect to the vertical that passes through its basis, the substrate could has a plane surface or represents a single-crystalline tip epitaxial to a plane single-crystalline surface. A single point of the substrate can serves as a basis for at least two tips. The tip can has a shape that includes at least one step and two links, the axis of each subsequent link can form its own angle in respect to the axis of the previous link. Also at least one of the steps serves as a basis for at least two links, at least one of them can be not epitaxial to the previous one. In principal it is possible that at least one of the links is formed by a nanotube, beeing so the nanotube can be combined by layers of different materials, one of them being carbon and at least one of the links can be formed by at least one atomic row. Also at least one tip can has a particle on its top that contains, in addition to the tip material, at least one more chemical element, the particle can be coated by a film of this or another element, and at least one chemical element, that is contained in the particle, can participates in the growing of the tip structure, and the particle can be coated by a film of this or another element. For special tasks chemical functional groups are deposited in the film. This invention proposes that a non-magnetic tip has a flat top, a monodomenic magnetic particle of a conical shape is placed on the flat top, basis of the particle contacting with the flat top. Also an electroconductive tip has a flat top perpendicular to the axis of the tip, the flat top is coated by a dielectric film, a p-n junction in the upper part of the tip being parallel and close to the flat top.

According to this invention a tip structure that includes a substrate and a single-crystalline tip can be so that the tip is not epitaxial to the substrate. Also axis of the tip forms a given angle in respect to the vertical that passes through its basis, the substrate could has a plane surface or represents a singe-crystalline tip epitaxial to a plane single-crystalline surface. A single point of the substrate can serves as a basis for at least two tips. The tip can has a shape that includes at least one step and two links, the axis of each subsequent link can form its own angle in respect to the axis of the previous link. Also at least one of the steps serves as a basis for at least two links, at least one of them can be not epitaxial to the previous one. In principal it is possible that at least one of the links is formed by a nanotube, beeing so the nanotube can be combined by layers of different materials, one of them being carbon and at least one of the links can be formed by at least one atomic row. Also at least one tip can has a particle on its top that contains, in addition to the tip material, at least one more chemical element, the particle can be coated by a film of this or another element, and at least one chemical element, that is contained in the particle, can participates in the growing of the tip structure, and the particle can be coated by a film of this or another element. For special tasks chemical functional groups are deposited in the film. This invention proposes that a non-magnetic tip has a flat top, a monodomenic magnetic particle of a conical shape is placed on the flat top, basis of the particle contacting with the flat top. Also an electroconductive tip has a flat top perpendicular to the axis of the tip, the flat top is coated by a dielectric film, a p-n junction in the upper part of the tip being parallel and close to the flat top.

This invention propose a method for preparation of the tip structure by means of epitaxial growing of the tip according to the vapor-liquid-solid mechanism on a substrate by deposition from a vapor-gaseous and/or gaseous mixture with using of at least one metallic solvent, so being the tip structure is growing as at least one tip so that the axis of the tip forms a given angle in respect to the vertical that passes through its basis. As the substrate a single-crystalline wafer oriented along a certain crystallographic plane can be used, this single-crystalline wafer allows to prepare the tip structure as at least one tip epitaxial to the substrate under an angle to its surface or a single-crystalline tip epitaxial to a flat single-crystalline surface can be used as the substrate. Also the tip structure which are mentioned above can be prepared by a changing the growing temperature and/or concentrations of compounds in the vapor-gaseous or gaseous mixture, and/or pressures of the vapor-gaseous or gaseous mixture, and/or by addition of at least one metallic solvent and/or its evaporation. Also after the growing the tip structure a diffusion of at least one chemical element into the structure is performed with conservation of the structure of at least one metallic solvent. After the preparation of the structure it can be immersed into an amorphous material, the composite obtained can be polished together with at least one apex of the tip structure until formation of a flat surface, and the amorphous material can be etched away. After the etching away the amorphous material, a diffusion of at least one chemical element into the material of the tip structure can be performed. A diffusion of at least one chemical element into at least one metallic solvent can be performed. Then by etching off the material that has diffused into at least one metallic solvent, the metallic solvent can be removed. And at least one chemical element can be evaporated onto all the surface of the tip structure. A part of the evaporated chemical element can be removed by an etching off the diffusion layer from the surface of the tip structure, or by etching off the amorphous layer with conservation of the chemical element on at least one apex. The epitaxial growing of the tip structure can be implemented, and by a changing the growing temperature and/or concentrations of compounds in the vapor-gaseous or gaseous mixture, and/or pressures of the vapor-gaseous or gaseous mixture, and/or by addition of at least one metallic solvent and/or its evaporation a step and/or a plateau on at least one apex can be created, after that the solidified globule can be removed. And at least one of the procedures described above can be used at least one more time. This invention also propose method for preparation of the tip structure according which at least one time a magnetic material is used as the evaporating one, the magnetic particle formed is sharpened by a bombardment with accelerated ions, and a monodomenization of the particle can be performed. So being the monodomenization can be performed by enduring of the particle in a constant magnetic field of a certain direction. And the monodomenization can be performed at a high temperature of the magnetic particle, the temperature can be reached by passing a field-emission current through the tip structure.

This invention also propose a method for preparation of at least one tip structure by directional growing according to the vapor-liquid-solid mechanism on a substrate at deposition from a vapor-gaseous and/or gaseous mixture with using of at least one metallic solvent, so that the tip structure is grown non-epitaxially to the substrate. And the tip structure can be created according to the mention above points.

Also hollow can be created in the substrate for the growing of the tip, and the hollow can has a shape that corresponds to the crystallographic structure of the tip material.

According to this invention a source of electrons that includes a substrate, a field emitter, and a source of charge carriers, so being the field emitter represents a tip structure according to the mentioned above points.

According to this invention a cantilever for scanning probe devices that includes a holder, a lever and a probe, so being the tip is implemented as a tip structure according to the mentioned above points.

According to this invention a cantilever for scanning probe devices that includes: at least two alternating plane-parallel layers of conducting materials separated by non-conducting layers; at least one bending section—a lever implemented from a first conducting layer; a probe placed on the lever, at least one electrode—a section of a second conducting layer arranged along the lever at the side opposite to the probe, so being the electrode contains a means for suppression of nonresonant oscillations of the lever, the means representing a feedback system. Also the probe can be implemented as a tip structure according to mentioned above points. And the electrode can contains a means for controlling the lever deflections, and/or a means for a forced deflection of the lever of its initial position, and/or a means for modulation of the resonant lever oscillations. Being so at the side of the lever that is opposite to the electrode side of the lever can be arranged another electrode implemented from an additional conducting layer and contained a means for controlling lever deflections, and/or a means for a forced lever deflection of its initial position, and/or a means for modulations of resonant oscillations of the lever, and/or a means for suppression of non-resonant oscillations of the lever, the system being acted as a feedback one. Also between the lever and at least one electrode a vacuum gap can exists, the gap can be filled by liquid and/or plastic material that allows a mutual shifting of the lever and the electrode relative to each other. Also the lever can has a Π- and/or V-shape and/or longitudinal cavity, the cavity forming lever arms. Also the lever can has a piezoresistive layer and/or semiconductor layer doped up to the $p^{++}$-conductivity. Also the lever arms separated by a longitudinal section can has doped layers of n-, $n^+$-, p-, $p^+$ type conductivity. And one of the lever arm can serves as a drain, another lever arm serves as a source for a control system, the arms being separated by a lever section that has another conductivity, one of the electrodes implements a function of a gate being a means of a control.

This invention also propose a scanning probe device that includes: a cantilever containing at least one lever, at least one controlling electrode and/or at least one electrode for controlling lever deflections of an initial position; a system for regulation and controlling the lever deflections, being so the lever is implemented according to any of the mentioned above points. Also one electrode can be placed along at least two levers. And the system for controlling the lever deflections can represents a system for registration of the changes of the capacity between the lever and at least one electrode and/or of the contour quality, that includes its capacity, for each lever being chosen its own control frequency. Also the control system can includes a system for the forced deflection that can be electrostatic and/or electromagnetic one. According to the previous positions at least two electrodes can be placed along the same lever, and the system for controlling the lever deflections can represents a system for registration of the changes of the capacity between the arms of the lever, separated by a longitudinal section, and at least one electrode, for a controlling the lever rotation relative to a longitudinal axis a specific frequency being chosen for each of the lever arms.

This invention also propose a method for preparation of a cantilever for scanning probe devices that includes a formation of a composite wafer consisting of at least two alternating plane-parallel layers of conducting materials separated by nonconducting layers; a formation of at least one lever from the first conducting layer; a creation of a probe on the lever, so being that at least one electrode arranged along the lever at a side opposite to the probe is formed from the second conducting layer. And the probe can be implemented as the tip structure according to the mentioned above points. Also the composite wafer can be prepared by bonding of wafers and/or mechanical and/or chemical removal of parts of the wafers with conservation of thin layers having a given thickness. Also at least one conducting layer and/or at least one non-conducting layer of the composite wafer can be prepared by a deposition of a material and/or materials. And an electrode with contact outputs/terminals and/or a mechanico-electric structure for systems of control and/or regulation can be formed on at least one conducting layer before the bonding and/or between bonding stages and/or after the bonding. Being so an electrode with contact outputs/terminals and/or a mechanico-electric structure for systems of control and/or regulation can be formed on at least one conducting layer before the deposition and/or between the deposition stages and/or after the deposition of the material and/or materials. And at least one conducting layer and/or at least one non-conducting layer can be used at the preparation of the cantilever as technological stop-layers. Also the probe can be implemented as the tip structure according to the mentioned above points.

1—silicon substrate oriented along the plane (111); 2—primary silicon whiskers=first link; 3—secondary silicon whiskers=second link; 4—nanotubes=third link; 5—"step"=silicon whisker branching point; 6—spatial coordinate.

Figure 9:
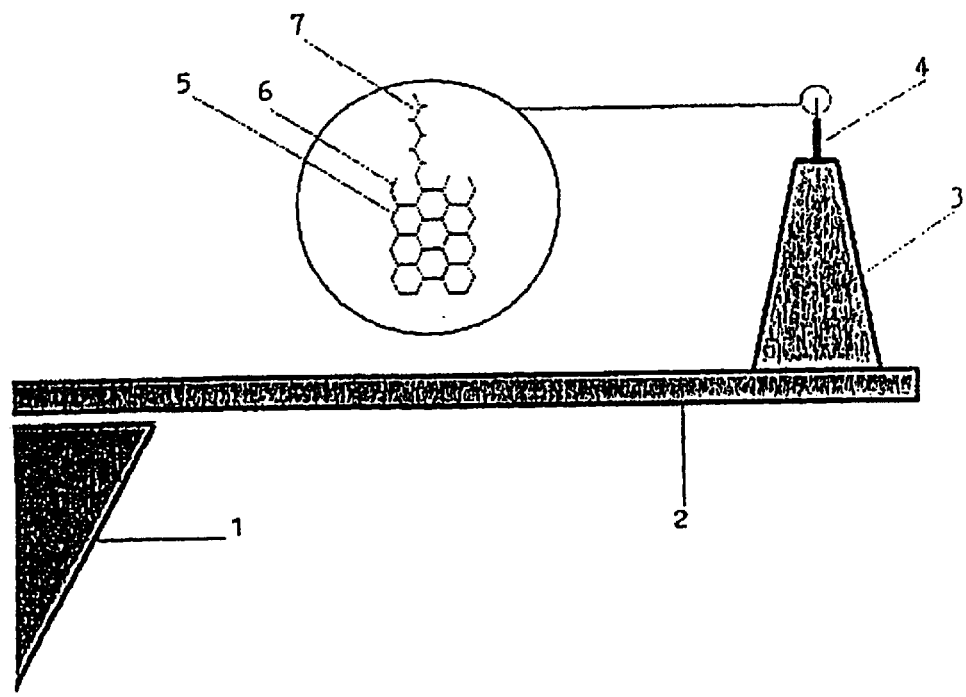

FIG. 9. A scheme of the SPM probe whose sensitive tip is formed by a carbon nanotube;
1—holder, 2—lever; 3—a silicon whisker basis; 4—a silicon whisker pin; 5—a nanotube; 6—"dangling" chemical bondings; 7—a single-atom row.

Figure 10:
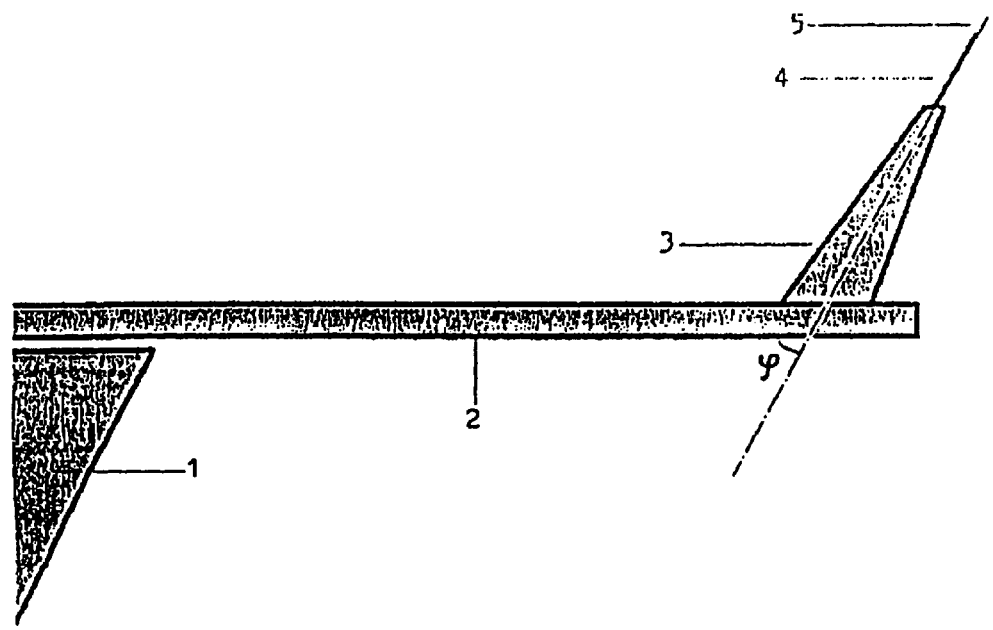

FIG. 10. A scheme of the SPM probe with an inclined silicon whisker tip;
1—holder; 2—silicon lever oriented along the silicon plane (111); 3—silicon whisker basis; 4—silicon whisker pin; 5—nanotube.

Figure 11:
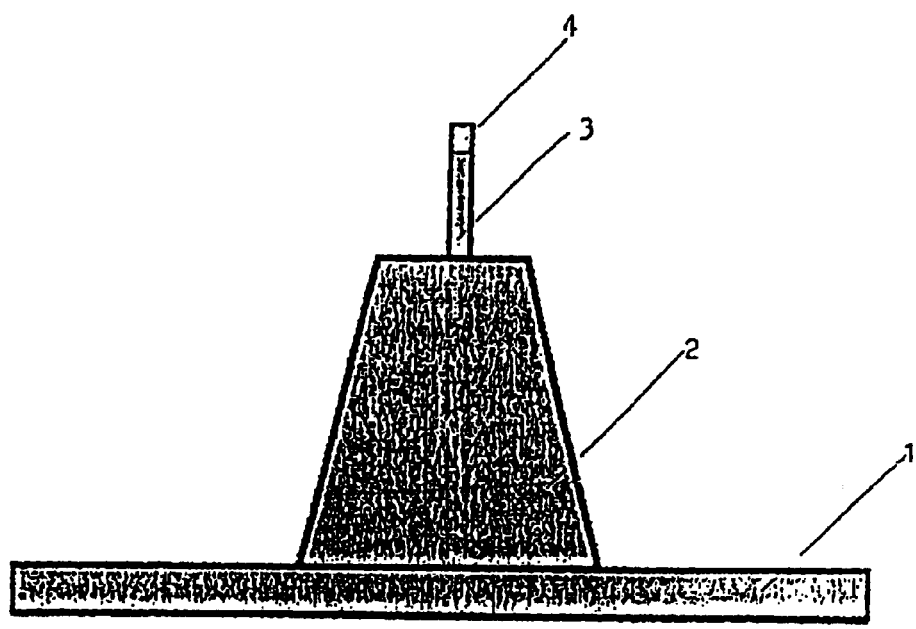

FIG. 11. A scheme of a silicon tip coated by a magnetic particle.
1—silicon substrate (111); 2—basic silicon whisker; 3—silicon pin; 4—evaporated magnetic particle.

Figure 12:
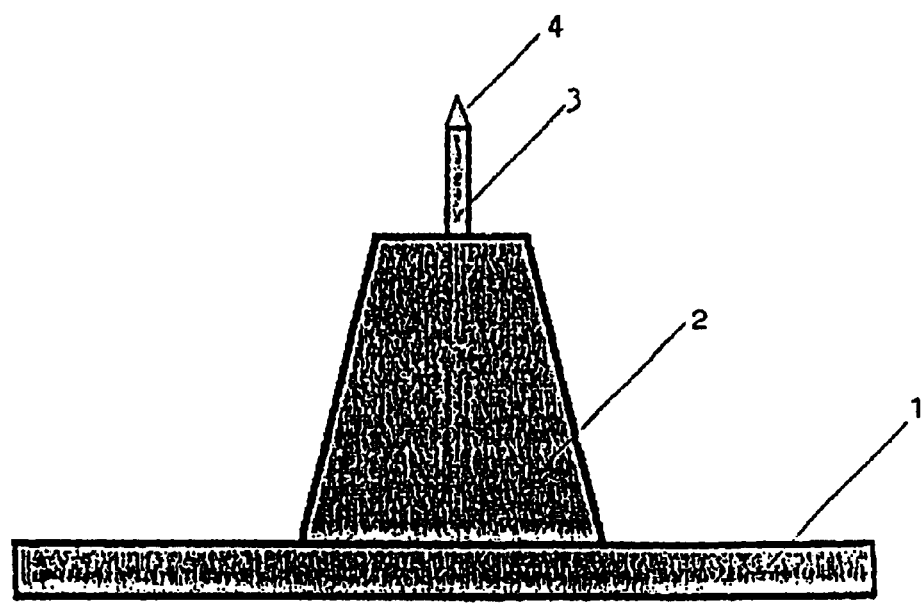

FIG. 12. A scheme of a silicon tip coated by a sharpened magnetic particle.
1—silicon substrate (111); 2—basic silicon whisker; 3—silicon pin; 4—sharpened magnetic particle.

Figure 13:
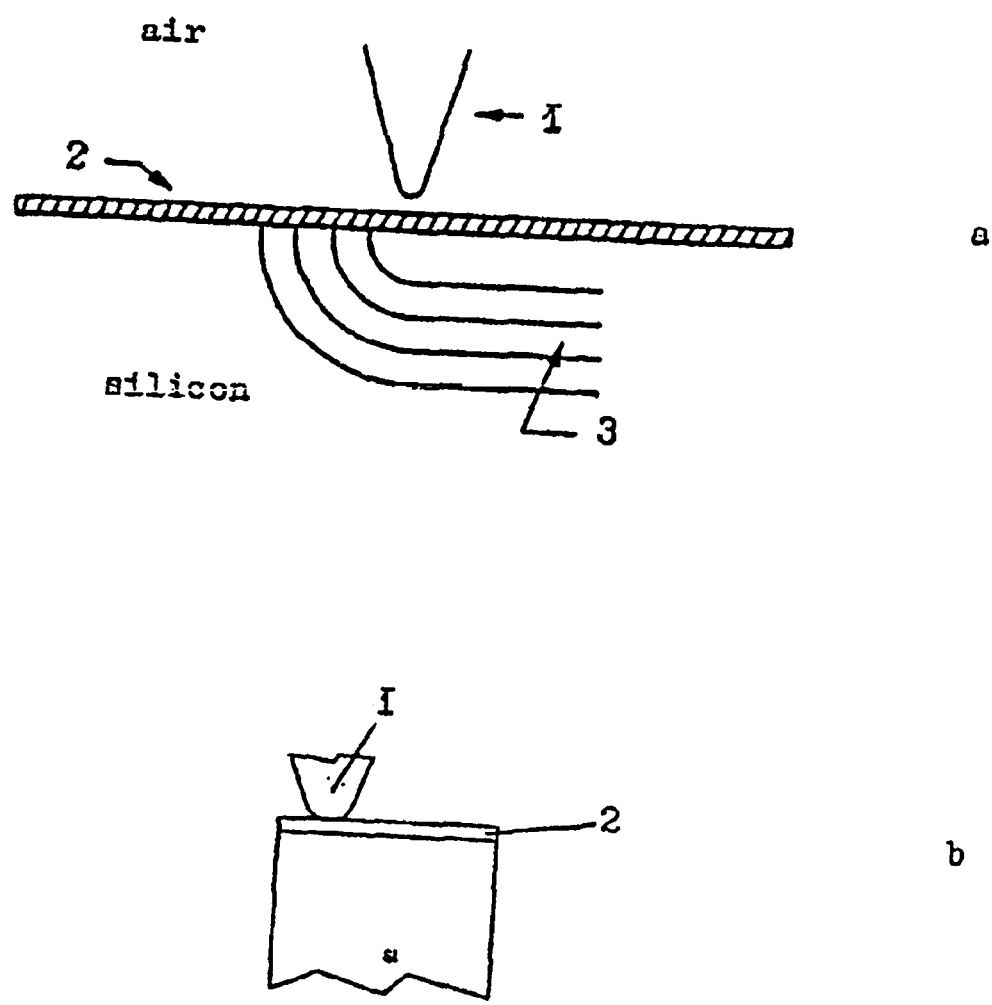

FIG. 13(a–b). Prior art of the capacitance probes.
a—from [9]: a scheme of the probe, and a scheme of the measurements;
1—probe, 2—insulator (oxide), 3—impurity;
b—from [10]: a scheme of the probe, and a scheme of the measurements;
1—probe, 2—oxide.

Figure 14:
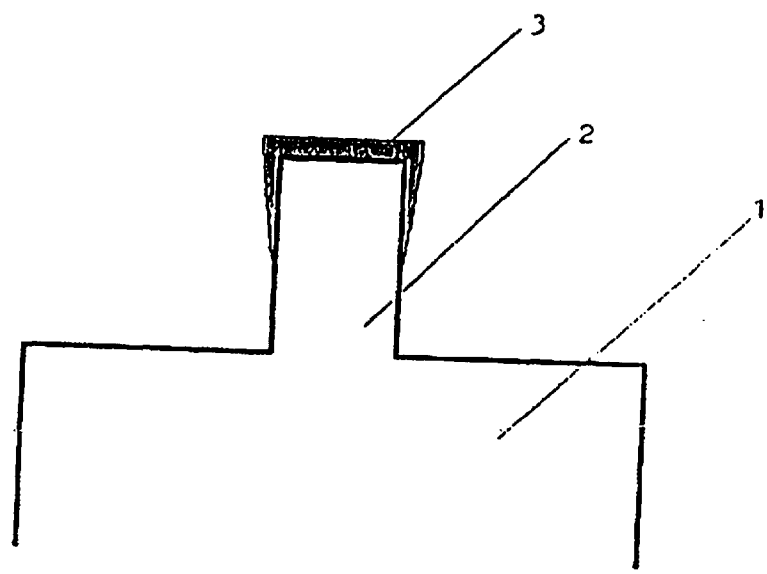

FIG. 14. A silicon tip with a flat apex coated by a dielectric.
1—basic silicon whisker; 2—silicon pin; 3—dielectric film.

Figure 15:
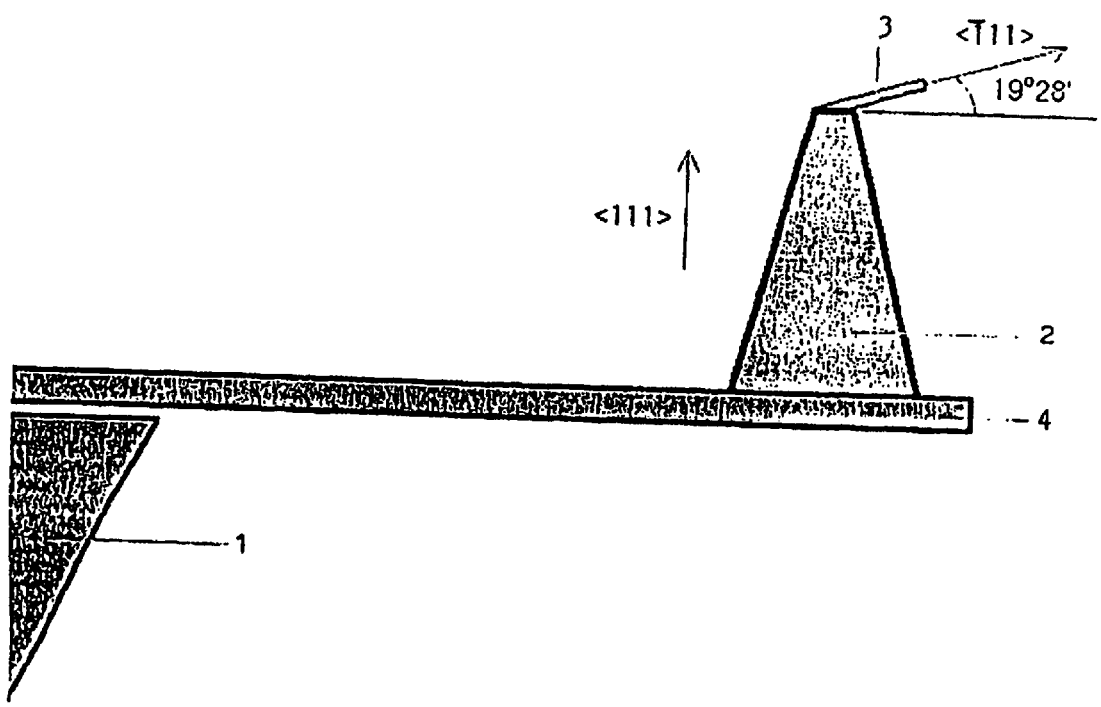

FIG. 15. A scheme of a SPM probe intended for investigations of samples having a complicated surface relief:
1—holder; 2—a basic silicon whisker grown in the direction <111>; 3—a silicon whisker that continues epitaxially the basis one in the direction <111>; 4—lever—111single crystalline silicon.

Figure 16:
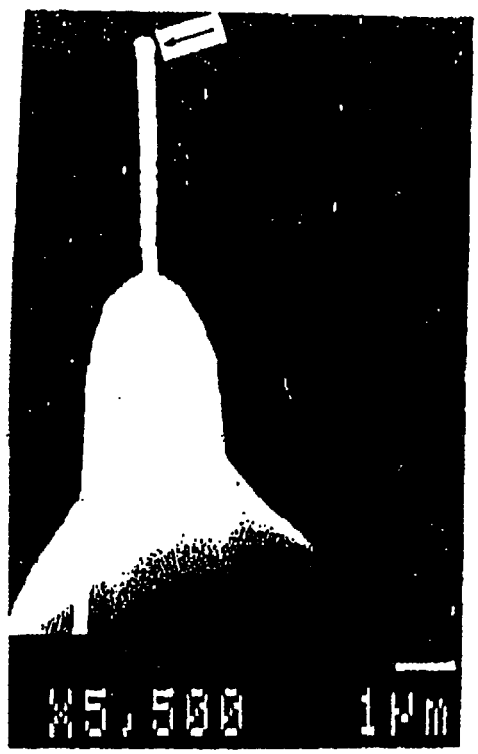

FIG. 16. Scanning electron micrograph of the step-shaped silicon tip/probe with the globule on its apex; the globule is shown by arrow.

Figure 17:
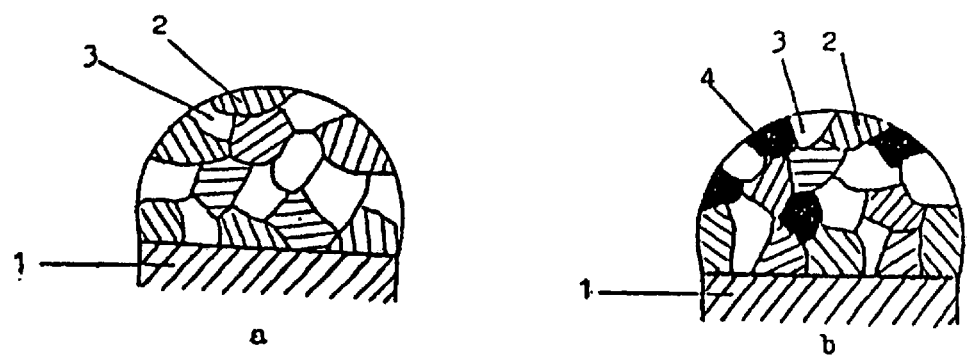

FIG. 17(a–b). A scheme of the globule formed on the apex of the silicon whisker
a—the globule is formed by a mixture of silicon and gold crystallites;
1—whisker, 2—silicon crystallite; 3—gold crystallite;
b—the globule is formed by a mixture of crystallites of silicon, gold, and a third chemical element;
1—whisker; 2—silicon crystallite; 3—gold crystallite; 4—crystallite of the third chemical element.

Figure 18:
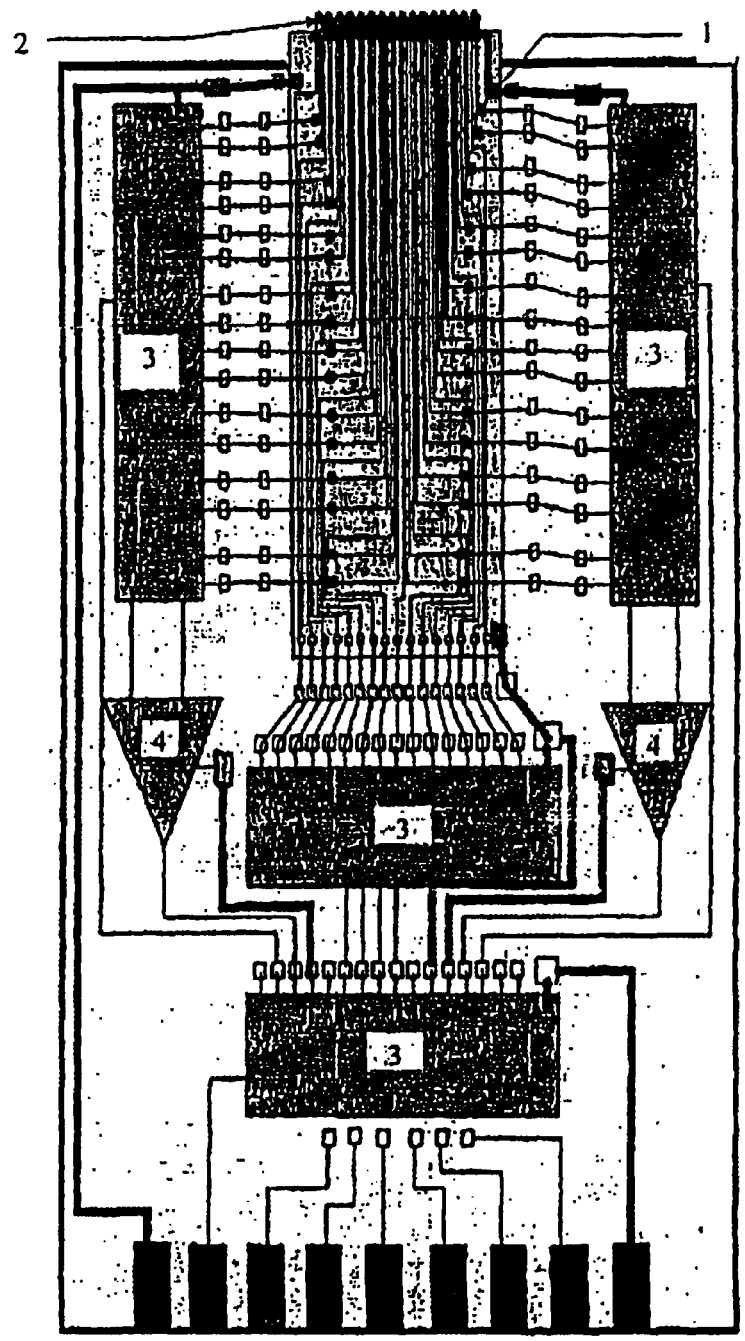

FIG. 18. A scheme of multi-lever device proposed in [13].
1—micro wires; 2—probes; 3—multiplexor; 4—operation amplifier.

Figure 19:
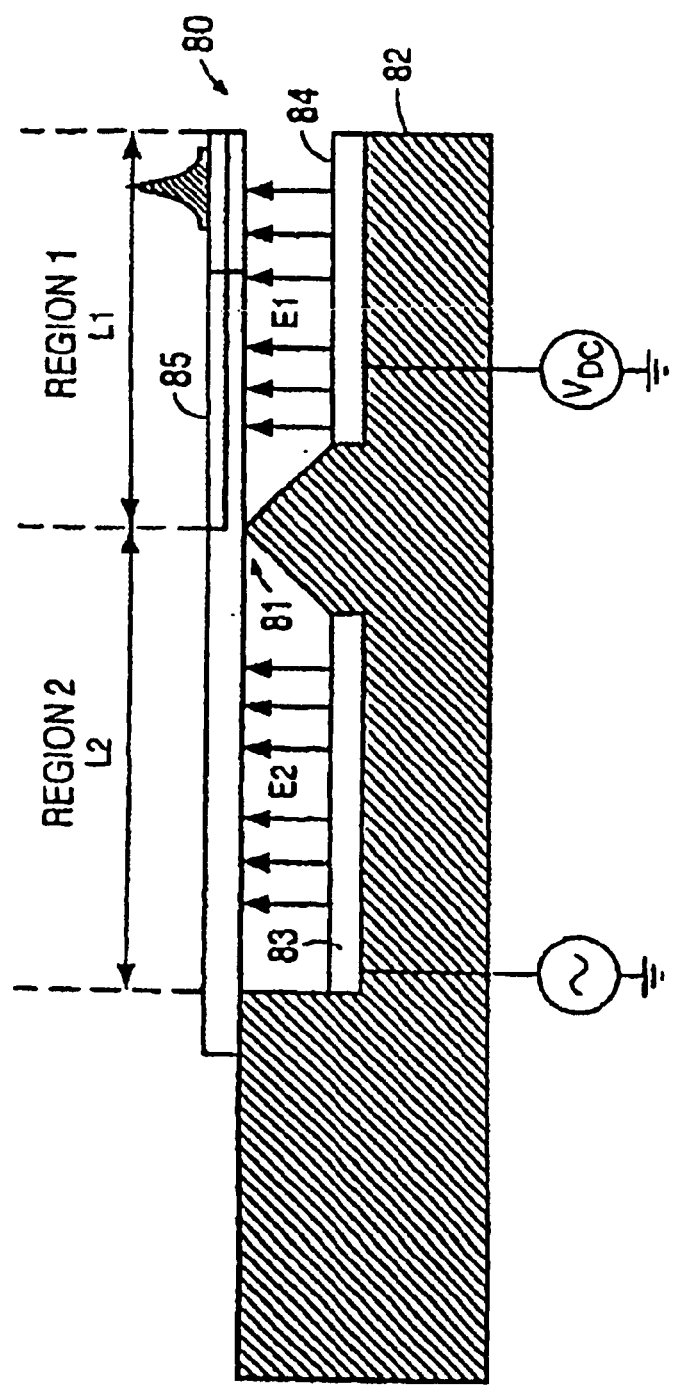

FIG. 19. A scheme of multi-lever device proposed in [14].
80—cantilever; 81—knife edge; 82—platform; 83—conductive region; 84—conductive region; 85—piezoresistor.

FIG. 20a, b, c, d. Process of mono-crystalline growth of whisker not epitaxial to substrate.
a—metal solvent; b—first stage of growth; c—leveling of growth; d—final of growth;
1—hollow; 2—metal solvent; 3—parasites; 4—substrate surface; 5—whisker; 6—substrate.

Figure 21:
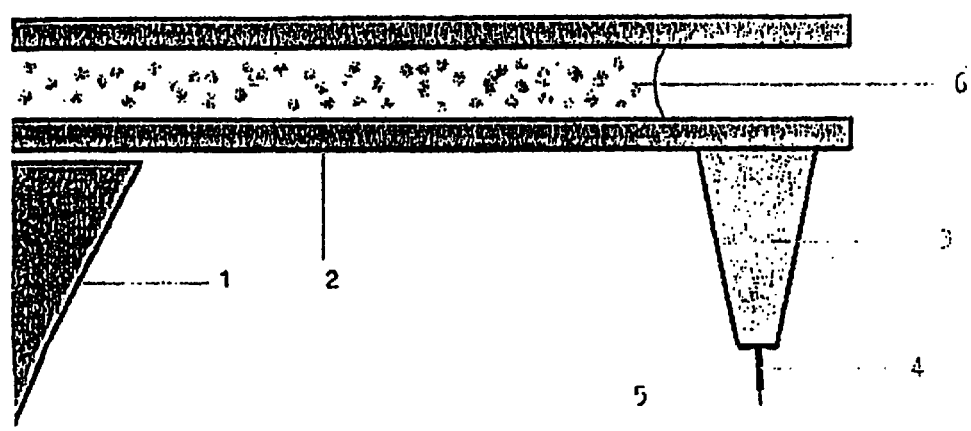

FIG. 21 Cantilever with deflections indicator represented by electrode placed along lever.
1—holder, 2—silicon lever oriented along the silicon plane (111), 3—silicon whisker basis; 4—silicon whisker pin; 5—nanotube; 6—plastic material; 7—electrode.

or of the

Figure 22:
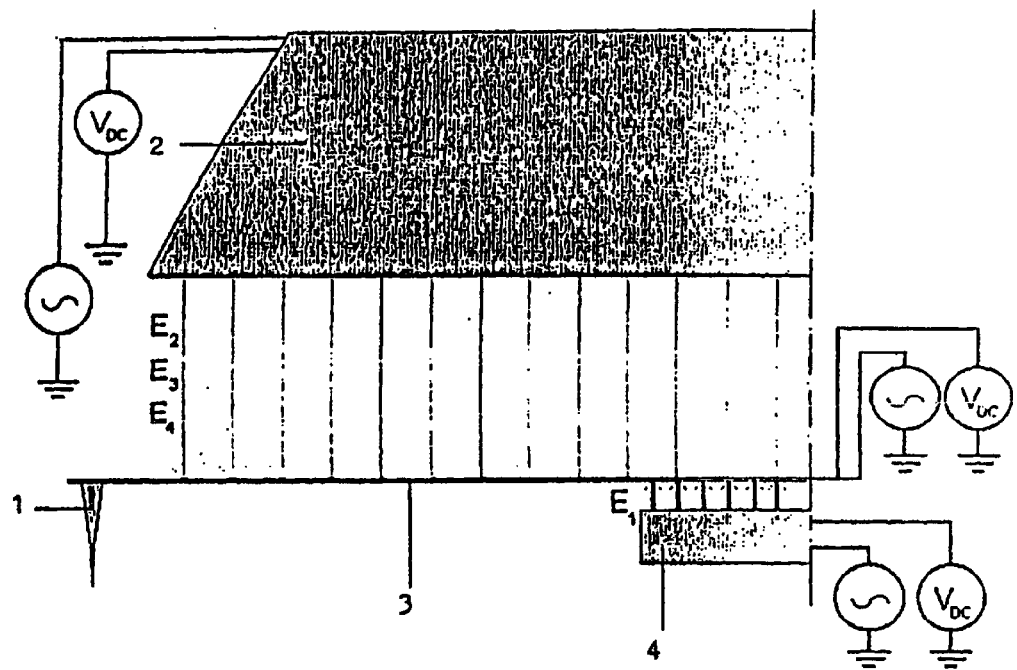
Figure 23:
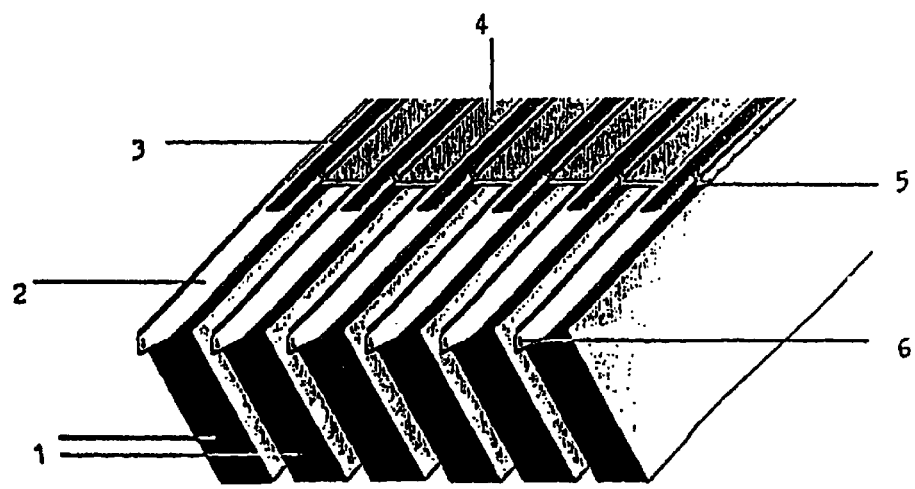
Figure 23:
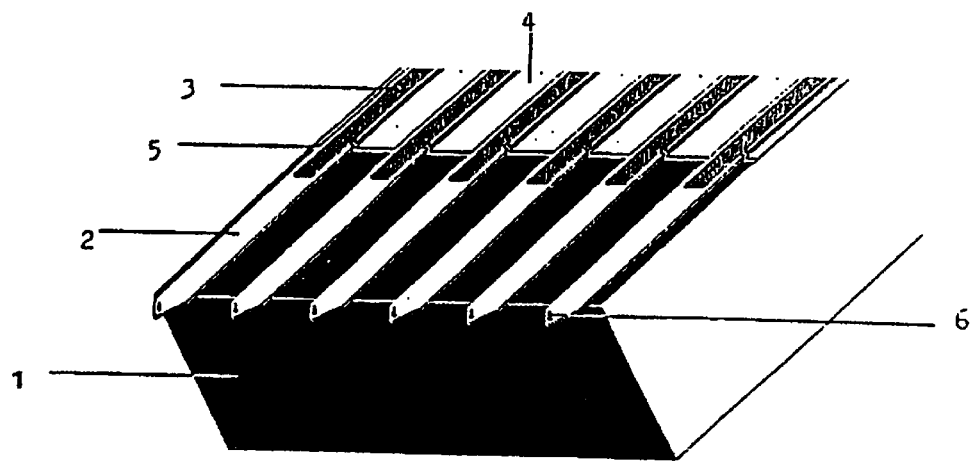

FIG. 22 Cantilever with integral system of control
1—whisker probe; 2—electrode of suppression of non-resonance, of deflections indicator and forced deflection system; 3—silicon lever oriented along the silicon plane (111); 4—electrode for modulation of the resonant lever oscillations;

FIG. 23(a–c) Multilever for scanning probe devices
1—electrodes of suppression of non-resonance, of deflections indicator and forced deflection system; 2—silicon lever oriented along the silicon plane (111); 3—electrode for modulation of the resonant level oscillations; 4, 5—non-conducting layers; 6—probe.

DETAILED DESCRIPTION OF THE CERTAIN INVENTIVE EMBODIMENTS

This invention is based on silicon tip probes prepared from silicon filamentary crystals ("whiskers") grown from the vapor phase according to the vapor-liquid-solid (VLS) process.

The growing process is performed as follows.

An array of gold dots, 5–7 μm in diameter, 0.2 μm in thickness, distanced each of other at 30 μm, is deposited onto a silicon wafer oriented along the most-close-packed crystallographic plane of silicon (111). The wafer is installed in the quartz chemical reactor and is heated to 800–900° C. in a flow of the gaseous reaction mixture $SiCl_4+H_2$. The gold dots contacted to the silicon wafer form liquid droplets forming a solution of silicon in molten gold. The liquid droplets act as catalytic particles for the chemical reaction so that at the temperatures indicated it proceeds preferentially on the surface of the droplets. The liquid solution of silicon in gold formed becomes supersaturated, and the excess of the silicon is deposited at the droplet-substrate interface. As a result, an epitaxial filamentary crystal ("whisker") grows under each of the droplets.

Figure 1:
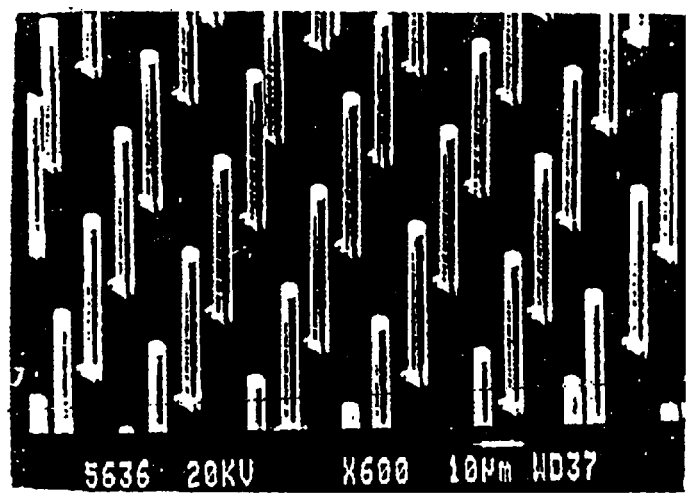
FIG. 1. An array of silicon whiskers grown on a silicon substrate (111).

The regular array of the whiskers is shown in FIG. 1. A solidified droplet ("globule") is seen at the apex of the each whisker. The globule consists of fine crystallites of silicon and gold.

Figure 2:
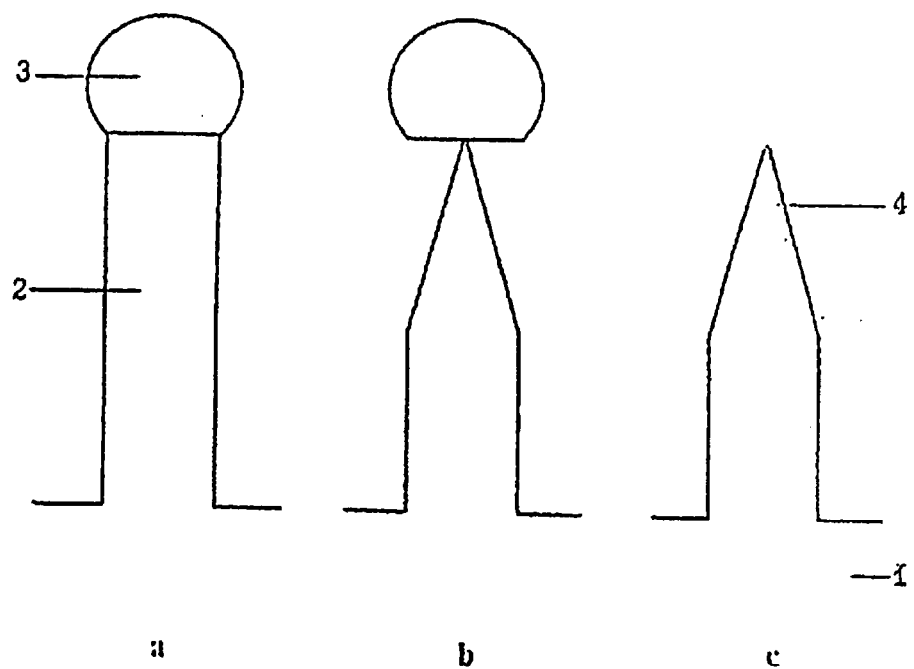
FIG. 2(a–c). A scheme of transformation of a silicon whisker, having a solidified globule at its apex, into a silicon tip:
  a—an initial stage; b—an intermediate stage; c—a final stage;
  1—silicon substrate; 2—body of the silicon whisker; 3—the solidified globule consisting of fine crystallites of silicon and gold; 4—the tip formed.

Next, the whiskers are transformed into silicon tips by an chemical etching in a solution that act at silicon slowly. The etching is performed up to a stage when the globule is dropped down. The procedure is illustrated in FIG. 2.

Figure 3:
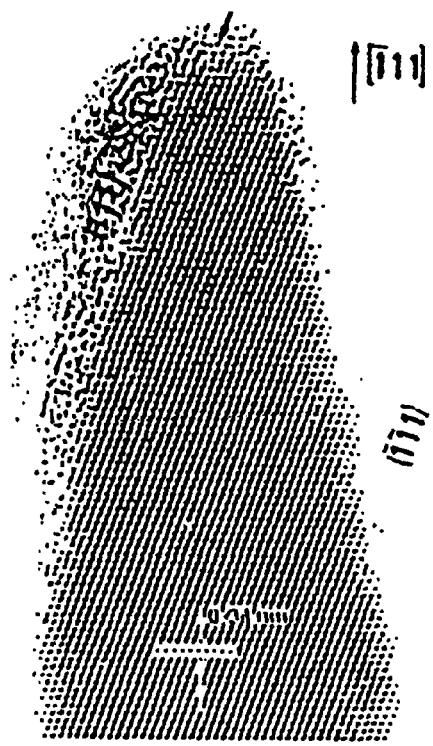
FIG. 3. A high-resolution-transmission electron micrograph of the silicon tip.

A high-resolution micrograph of a tip is shown in FIG. 3.

Figure 4:
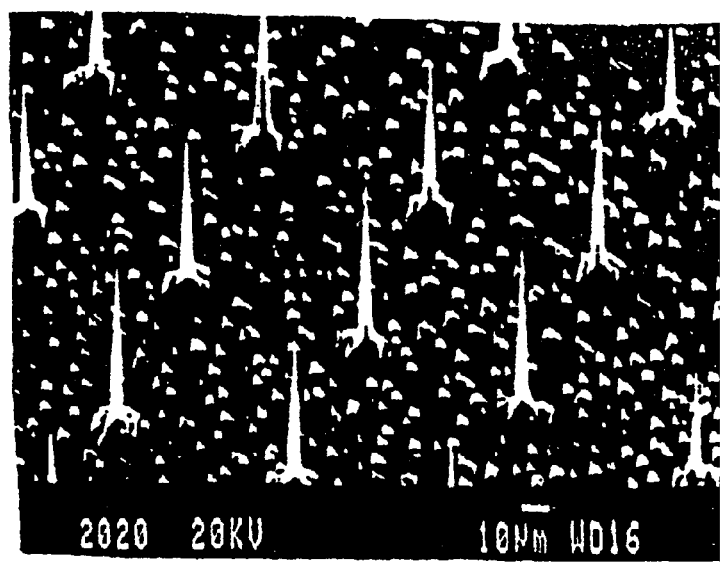
FIG. 4. An array of silicon tips prepared from the array of silicon whiskers.

A result of the transformation for the array of the whiskers is shown in FIG. 4.

If the whisker growing process is performed in two stages with different growth conditions (different temperatures, different concentration of $SiCl_4$ in the reaction mixture, etc), whiskers with a step shape can be formed. By the etching procedure illustrated in FIG. 2 a step-shaped silicon tip shown in FIG. 5 can be formed.

Figure 6:
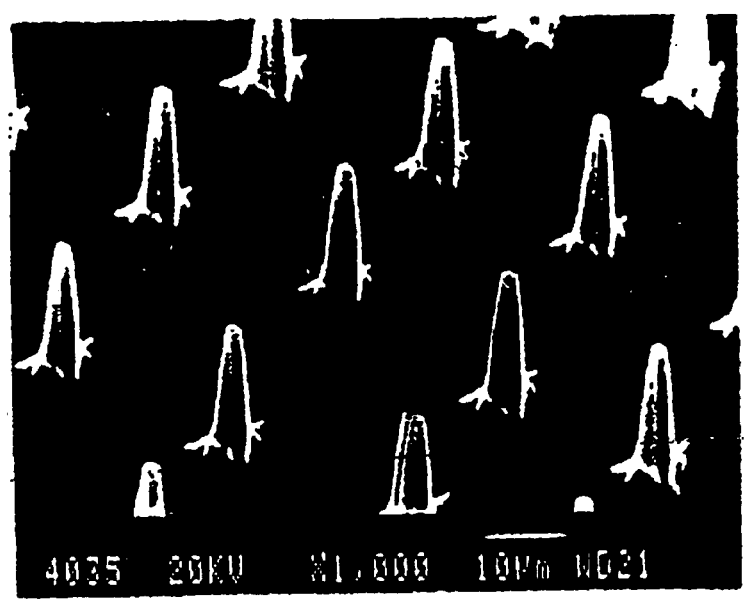
FIG. 6. An array of silicon columns, with flat tops, formed from the array of silicon whiskers.

The array of the silicon whiskers can be transformed into an array of silicon "columns"(whiskers with flat plateau at their tops) if act to the globule, rather than to the body of the silicon whisker itself, for example, by etching the metallic solvent (gold), etc, see FIG. 6.

Figure 5:
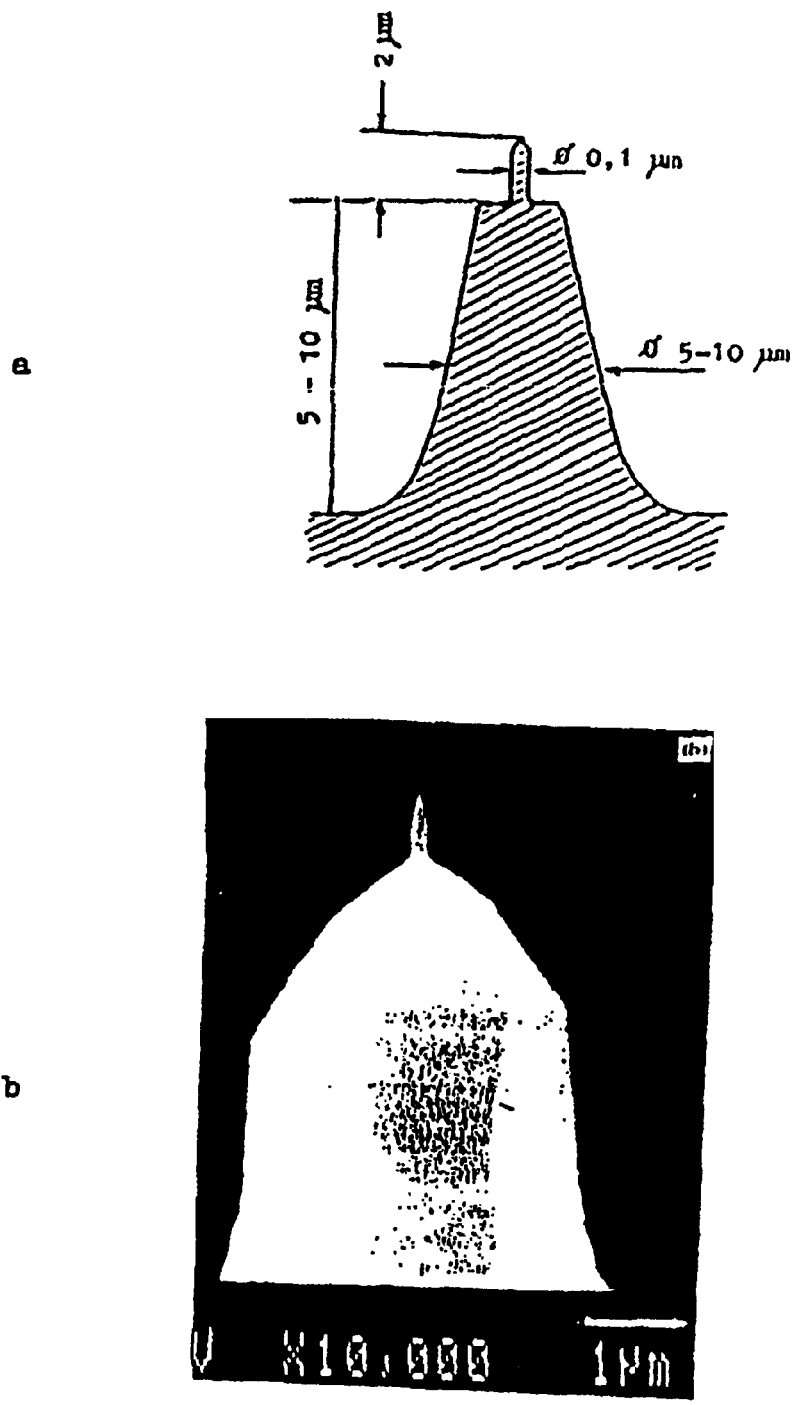
FIG. 5(a–b). A scheme (a) and a scanning-electron-micrograph (b) of a step-shaped silicon tip.
Figure 7:
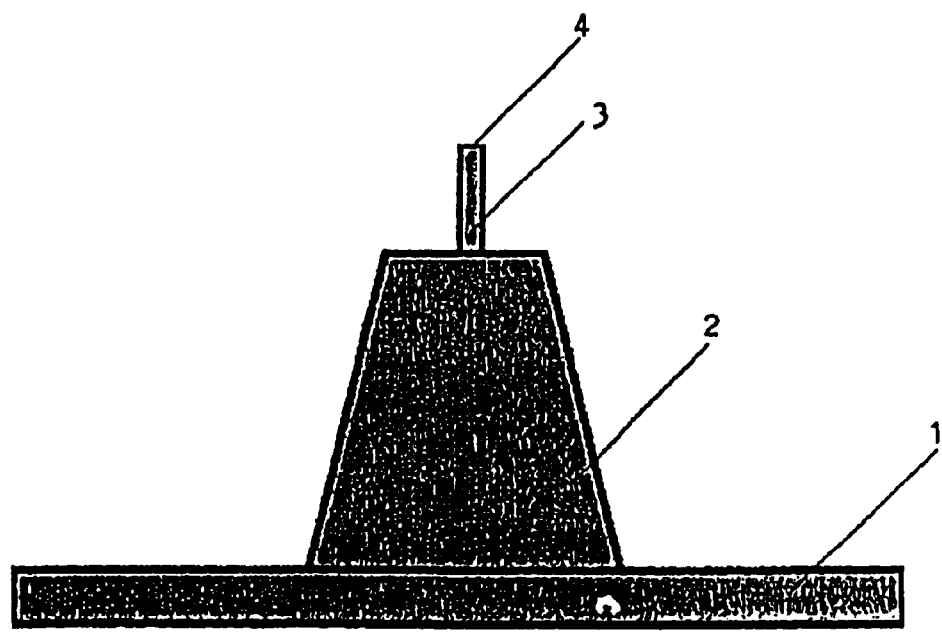
FIG. 7. A scheme of the step-shaped silicon tip with a small plateau on its apex;
  1—silicon substrate (111); 2—basic silicon whisker; 3—silicon pin; 4—top plateau.

By combining the samples/procedures illustrated in FIG. 5 and FIG. 6, a steps shaped silicon tip with a small flat plateau at its apex can be formed, see. FIG. 7.

The tips and the arrays of the tips shown in FIGS. 1 to 7 are used, according to this invention, for preparation of various devices.

One of the most typical, broad and important examples of the applications of the tip structures proposed in this invention is in the field-emission electronics.

Last years, large successes have been achieved in the field emission from carbon nanotubes. However, efficiency of the nanotube field emitters is strongly decreased when they are too dense so that the electric fields at their apices are highly lowered. It is known that the field emitters act independently each of other if they spaced at distances comparable with their heights.

Figure 8:
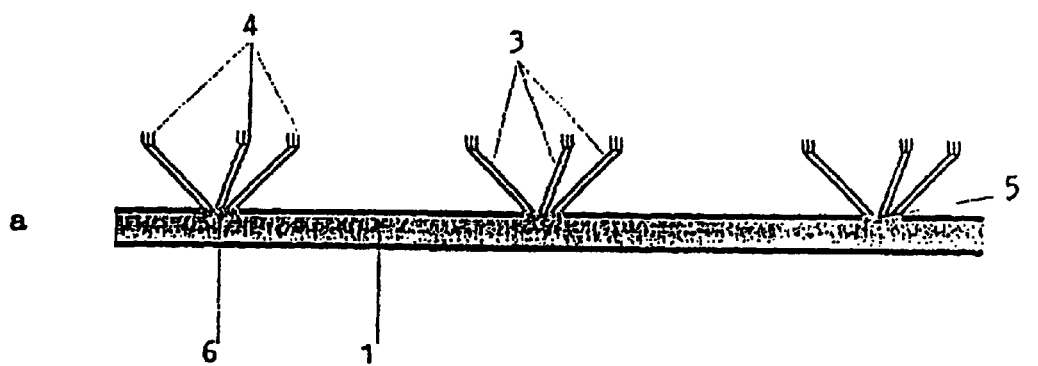
FIG. 8(a–b). A scheme of a cathode tip structure with multiple-multiple-multiple (M3) field emitters formed by carbon nanotubes on silicon whisker tips.
Figure 8:
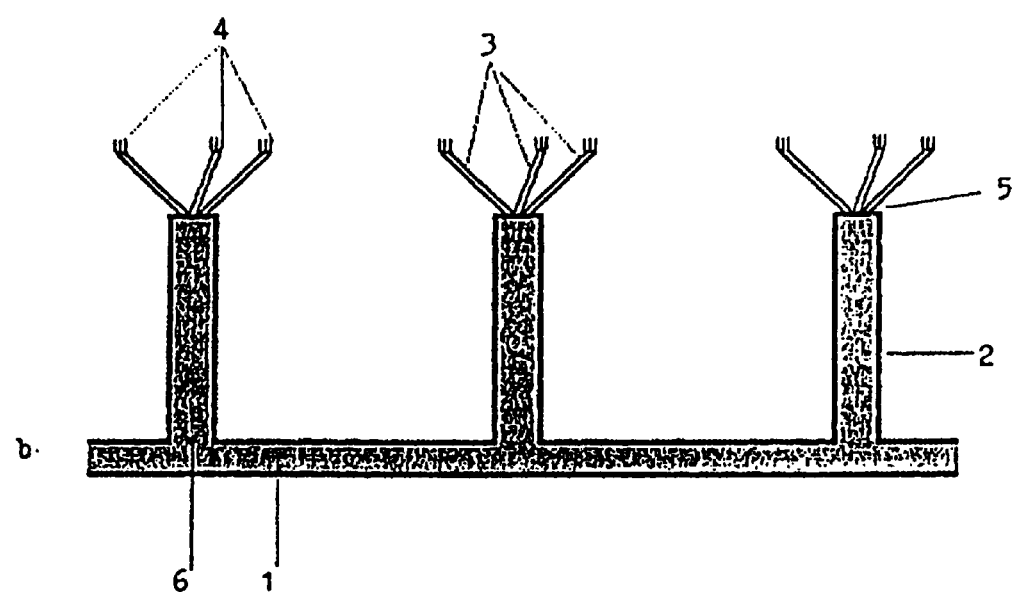

An optimum design of the field emitters based on the nanotubes could be realized if combine regular silicon tip arrays with a branching of the whiskers and with formation of "bundles" of the nanotubes on their apices this is "multiple-multiple-multiple" ($M^3$) tip structure shown in FIG. 8. By choosing the distance between the regular silicon basic ("primary") whiskers, it is possible to increase multiply the field-emission currents from such tip structures.

An important improvement in the field emitters can be realized if provide simultaneous emission of a variety of the emitters. It is possible if different emitters have a sufficiently high resistance. In this case, the resistance can be considered as a "ballast resistance" in the electric circuit. Such an idea, patented in [3], can be realized in the $M^3$ tip structure (see FIG. 8b).

The same idea can be realized in the tip structure shown in FIG. 8a ($M^2$ tip structure) if a high "macroscopic"resistor incorporate in series to the tip structure.

The preparation process for carbon nanotubes can be combined with the VLS process that is used for whisker growing. This combination consists in the fact that a metal solvent used for whisker crystal growing can be used also as a catalyst for formation of the nanotubes.

SPM probes are other applications of the nanotube-on-silicon tip structures.

A scheme of such probes is shown in FIG. 9. Here, the small size of the apex area of the step-shaped silicon tips shown in FIG. 5 is illustrated as the silicon pin 4. It has an advantage because the probability of nucleation of the nanotubes depends on the apex area of the tips, and the smaller the area the larger is a chance to have there a single nanotube necessary for the SPM probe. At an extreme case, the small size of the nanotube can be minimized down to a single-atom row 7.

Other versions of the SPM probes can use the step-shaped silicon tips shown in FIGS. 5 and 7.

In particular, the SPM probe shown in FIG. 5b is suitable for applications in the semiconductor technology, e.g., for studying of the profiles of sub-micron-width grooves [16]. The nanometric ultra-sharp tip ensures high resolving power, whereas the relatively thick basis of such a probe ensures a sufficient mechanical stability against vibrations. For such cases, whisker probes are especially suitable [11, 17].

Another example for applications of the tip structure proposed in this invention is a special SPM probe for studies even more narrow (width less than 0.3 μm) and relatively deep (deepness more than 4–5 μm) grooves. This is a typical problem in the current and nearest-future semiconductor technology. The problem becomes especially difficult if the grooves are not vertical. To this aim, a SPM probe shown in FIG. 10 is suitable. The cantilever for such a probe is prepared from a composite plate that consists of a silicon wafer coated by a film of $SiO_2$ and a silicon layer having an orientation that is declined off the close-packed orientation (111) for angles φ about 15 to 25°. Such a relatively small angle allows to use a traditional technology for growing silicon whiskers according to the VLS mechanism shown above (see FIG. 1) and described in more detail in [18, 19]. The ability of silicon to grow in the direction (111) allows to prepare such probes.

The step-shaped silicon tip with the small plateau on its apex shown in FIG. 7 is suitable for preparation of the probes for the magnetic force microscopy (MFM) and for the electrical capacitance microscopy (ECM).

Typical size of the plateau is 100 nanometers in diameter. A magnetic (Fe, Co, or Ni) film about 100 nanometers in thickness is deposited onto the plateau by vacuum evaporation (FIG. 11). Calculation has shown that the resolving power of the MFM probe is better than 90 nanometers.

The magnetic particle having the cylindrical shape can be transformed into conical one by ion bombardment.

EXAMPLE 1

A beam of argon or nitrogen ions accelerated by electrostatic field 5 kV is directed along the axis of the probe. A conical particle with an angle 40–50° at its apex is formed, as it is shown in FIG. 12. The conical magnetic particle ensures the resolving power of the MFM about 50 nanometers. Calculation has shown that, at such a design of the probe, a contribution of the magnetic film deposited on the basis of the probe into a signal registered by the SPM is at least 100 times less than that of the conical particle deposited onto the tip.

The magnetic particle prepared by evaporation and, then, treated by the ion beam bombardment has a polycrystalline structure, each magnetic domen formed in a given crystalline grain having its own (arbitrary) direction of magnetization. In order to improve (homogenize) the magnetic properties of the particle, it is subjected to monodomenization by enduring the magnetic probe at a constant magnetic field of a given direction.

Examples of the prior art for the ECM probes are shown in FIG. 13. There, the tips of the probes have a hemispherical shape. Electrical capacity, the measurable parameter, depends on the shape and curvature radius of the tip and can be changed from tip to tip. In addition, the shape of the tip can be changed during the measurement procedure due to its possible contact with the solid surface studied.

In this invention, it is proposed to use in the ECM technique the step-shaped silicon tip with a flat plateau on its apex shown in FIG. 7. The tip is coated by a dielectric film such as $Ta_2O_5$ (having the value of dielectric constant 25 units, compare with 5 units for $SiO_2$), $TiO_2$ (100 units), $SrTiO_3$ (250 units), $BaTiO_3$ (1500 units) that have a high value of the dielectric constant (FIG. 14). This allows to work without contacting the tip with the surface studied. In addition, the flat shape of the tip surface facilitates exact calculations of the capacity and other related parameters.

EXAMPLE 2

A thin film of titanium is deposited onto the silicon tip having the plateau. Then, the film is oxidized by beating to a high temperature in an oxygen-containing atmosphere. A $TiO_2$ coating is formed on the plateau.

Other problems that can be solved with the whisker based SPM probes relate to investigations of objects with complicated shapes (such as biological macromolecules, solid surfaces with a course relief, with arbitrary microcavities, etc). For investigations of such objects, a whisker probe having a shape shown in FIG. 15 can be used. The probe consists of at least two parts, a lower one and an upper one. The lower part is formed by a relatively thick silicon whisker perpendicular to a single-crystalline silicon substrate oriented along the most-close-packed crystallographic plane (111) so that it has the orientation <111>. The upper part is formed by another, a more narrow whisker that grows in another, also crystallographic direction <111>that forms the crystallographic angle 70°32 with the axis of the lower part.

One more version of the whisker based SPM probes relates to investigations of chemical constituents of matters, for example mapping the spatial arrangement of chemical forces existing on solid surfaces. The technique is named "chemical force microscopy" [12] and is based on discrimination of the chemical forces by specific material of the probe tip or by specific coatings the tip. Existing SPM probes made of silicon or silicon nitride have a weak adhesion ability in respect to the tip materials or tip coatings.

It is proposed in this invention to use silicon whisker probes whose tips are formed by the globules that contain, in addition to silicon, at least one more chemical element.

Such a probe is shown in FIG. 16. The globule contains, in addition to silicon, also a solvent (gold in this case) that participates in the whisker growth. Other materials (metals) can be added to the solvent so that the globule contains at least three chemical elements, see FIG. 17.

The globule can be coated by a thin film of the constituents having a good adhesion to it.

EXAMPLE 3

Silicon whisker is grown by means of a mixture of gold and indium. Accordingly, the solidified globule contains, in addition to silicon, also crystallites of gold and indium. The whisker probe for the chemical force microscopy is coated with an indium film. Owing to the fact that some of indium crystallites of the globule are exposed at its surface, the adhesion of the indium film is enhanced.

Also, the globule, with the constituent coating or without it, can be coated with various chemical functional groups.

EXAMPLE 4

Figure 20:
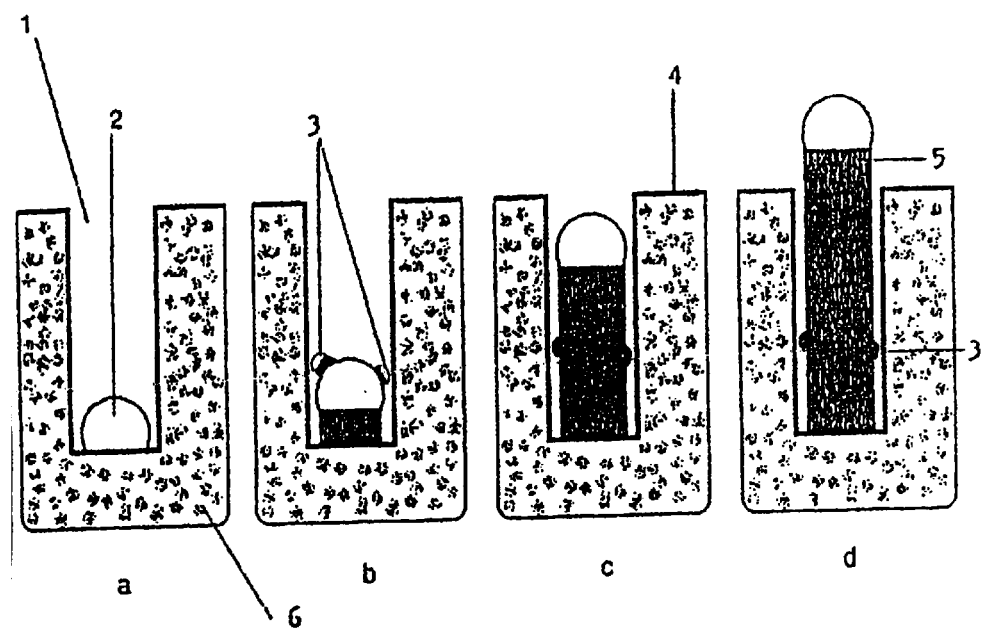

A possibility to grow filamentary crystals—whiskers by the VLS process represents an important achievement of micro- and nano-electronics. The process allows to implement epitaxial growing the whiskers and to control the process. However, the necessity to use a substrate that has a certain crystallographic orientation is a drawback of the process. In this invention, it is proposed an approach how to solve this issue. To this aim, in a substrate with an arbitrary (e.g., amorphous) structure a deep hollow ("well") is created, and a metallic solvent is placed on its bottom (FIG. 20). Such a substrate is installed in the chemical reactor for whisker growing. During the process crystalline nuclei are formed in the solvent droplet. At an initial stage, all the nuclei, except one nucleated at or close to the apex of the droplet, are at approximately equal conditions. The apex nucleus has a most abundant feeding. In addition, during the whisker growing, growth conditions for whiskers that have non-vertical component are deteriorated, accordingly, whiskers grow preferentially along the well.

In addition, the selective growth direction can be improved if the well has faceting in accordance with the direction of the preferential growth of a given material. For example, for silicon whiskers that are crystallizing in the diamond lattice the well should have a shape of equilateral triangles or hexagons.

EXAMPLE 5

According to this invention, one of the version for tracking in the SPM system is realized in the cantilever design proposed in FIG. 21. Using silicon-on-insulator composite wafer (silicon (100) basic wafer/$SiO_2$ separating layer/ silicon (111) film/$SiO_2$ separating layer/silicon (100) film) lever (111) is formed, a silicon whisker is grown on the lever, and a tip probe formed from the whisker. A plane electrode parallel to the lever is formed from the silicon film (100). The gap between the lever and the electrode is filled by a plastic material 6 (see FIG. 21). The filling the gap by the material allows electromechanical properties of such a system to keep constant.

By feeding resonant oscillations to this system an initial regime is specified that corresponds to a certain value of the quality factor of the resonant system. The quality factor is changed at the interaction of the probe with the surface studied. The change serves as the parameter that allows to track shifting the lever and, in such a way, to form an image of the surface studied.

EXAMPLE 6

A most vivid example of implementation of the cantilever with integrated controlling systems for indication of deflections, for forced feeding/removal the lever relative to the surface studied, and for feeding the resonant oscillations to realize a "taping mode" regime is shown in FIG. 22. The electrode 4 placed along a small starting part of the lever has a gap in respect to the lever that is filled by a plastic material similarly to the Example 5. By feeding to the electrode 4 an alternating voltage with a frequency of the electric field $E_1$, about 100 kHz between the lever 3 and the electrode 4, it is possible to excite resonant modulations of the lever without a necessity to feed a mechanical oscillation to the holder of the probe (that represents a significant hindrance at researches in liquids when mechanical oscillations excite strong secondary—non-desirable!—modes of oscillations in the liquid medium).

In the example considered, the electrode 2 contains three means for controlling the lever behavior an electrostatic system $E_2$ for forced deflections, a system $E_3$ for indication of deviations by measurement of capacity between the lever 3 and the electrode 2, and a system $E_4$ for suppression of non-resonant oscillations (e.g., secondary oscillations appearing at discontacting the probe off the surface, the contact originating by adhesion forces). The last one ($E_4$) operates according to the following principle. A constant electrostatic charge is applied to the lever. When non-resonant oscillations appear at the lever, a corresponding charge is induced at the electrode 2 with the frequency of the above (initial) oscillations. The induced charge is analyzed and applied again to the electrode 2, however, with an opposite sign to the induced charge and some phase advance. This causes a temporary hall of the oscillations that had induced such a charge.

The distance between the lever and the electrode 2 is chosen so that the electrical forces of the systems for indication of deflections and the for suppression of non-resonant oscillations would be significantly lower than die Van-der-Waals forces.

EXAMPLE 7

The integration of several control systems in a single simple device, as it is proposed in this invention, allows to use such a device in the regime of multilever scanning of a highly-coarsed surface (see FIG. 23a). If use two or more levers for increasing the scanning rate, a problem arises: how to coordinate their operation if one of them should investigate a hollow whereas another one, spaced at some macroscopic distance from the former one, should investigate a hill? In the standard version of single lever, the problem is solved by feeding/removal of the holder. However, in the case of the multilever the problem can be solved by special techniques. In this invention, the feeding/removal of the lever by forced electrostatic deflection ($E_2$) is used.

In order to simplify the preparation of the multilever, a possibility to arranging several levers along the same electrode of the control systems is considered in this invention (see FIG. 23b).

In order to discriminate signals arrived to the systems for the indication of the deflection of the levers, it is sufficiently to apply signals of different frequencies to the pairs "lever-electrode 2".

For the system of the forced feeding/removal, as well as for the system of the suppression of non-resonant (parasitic) oscillations, it is necessary to decouple the levers each of other galvanically.

Figure 23C:
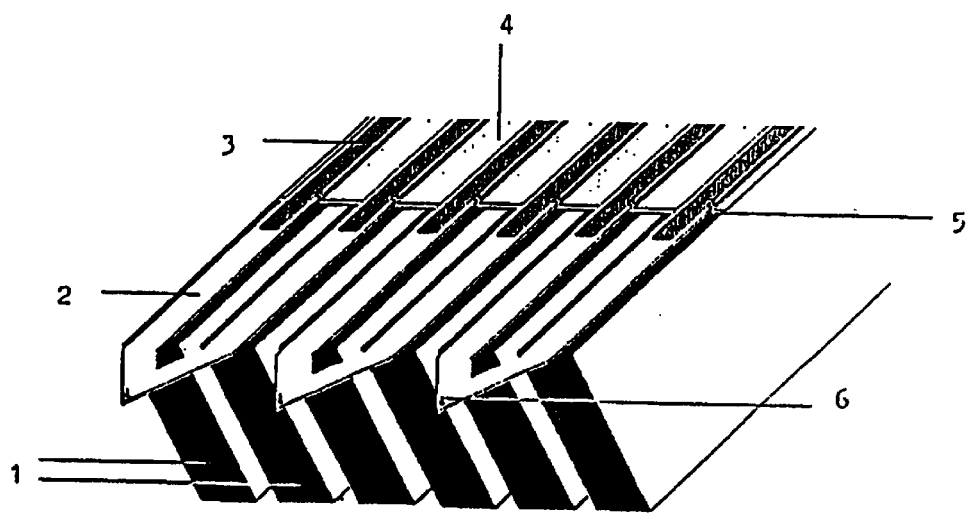

For a more precise investigation of the surface morphology, this invention considers a possibility to track the rotation modes around the elongated axis. To this aim, the lever is implemented in V- or II-shaped version. If a single electrode 2 in FIG. 2 is arranged along each of arms of such a lever (see FIG. 23c), it is possible to obtain all the necessary information.

EXAMPLE 8

A using multilayer composite wafer like silicon-on-insulator (SOI), where the lever is prepared from a silicon layer oriented along the plane (111), is the most typical method for preparation of the multilevers. Structures shown in FIGS. 23a, b, c are prepared by repeated procedures of photolithography and etching.

After the structures have been prepared, whiskers were grown on them, and tips we prepared from the whiskers, as it was described above.

Terms and Synonyms Used in this Invention:

Tip structure=substrate+tip(s);

Tip=links+steps;

Step=point of angle changing=point of changing any geometric parameter of the tip;

Branching point=step where the tip is doubling, thripling, etc.

We claim:

1. A tip structure for an electron emissive device or a scanning probe device, comprising a single-crystalline substrate and a single-crystalline tip epitaxial to the substrate, wherein an axis of the tip forms a predetermined angle with respect to a vertical axis that passes through the substrate.

2. The tip structure of claim 1, wherein the substrate has a plane surface.

3. The tip structure of claim 1, wherein the substrate represents a single-crystalline tip epitaxial to a plane single-crystalline surface.

4. The tip structure of claim 1, wherein a single point of the substrate serves as a basis for at least two tips.

5. The tip structure of claim 1, wherein the tip has a shape that includes at least one step and two links, an axis of each subsequent link configured to form a predetermined angle with respect to the axis of a previous link.

6. The tip structure of claim 5, wherein at least one step serves as a basis for at least two links, at least one of links configured to be not epitaxial to a previous link.

7. The tip structure of claim 5, wherein at least one of the links is formed by a nanotube.

8. The tip structure of claim 7, wherein the nanotube is combined by layers of different materials, one of them being carbon.

9. The tip structure of claim 5, wherein at least one of the links is formed by at least one atomic row.

10. The tip structure of claim 1, wherein the tip has a particle on a top that contains, in addition to a material of the tip, at least one more chemical element, wherein the particle is coated by a film of the chemical element.

11. The tip structure of claim 10, wherein at least one chemical element, that is contained in the particle, participates in a growing of the tip structure.

12. The tip structure of claim 1, wherein a nonmagnetic tip has a flat top, and wherein a monodomenic magnetic particle of a conical shape is placed on the flat top, a basis of the particle contacting the flat top.

13. The tip structure of claim 1, wherein an electroconductive tip has a flat top perpendicular to the axis of the tip, wherein the flat top is coated by a dielectric film, and wherein a p-n junction in an upper part of the tip is parallel and close to the flat top.

14. The tip structure of claim 1, wherein a magnetic or dielectric material is formed on a distal end of the tip.

15. A tip structure for an electron emissive device or a scanning probe device, comprising a substrate and a single-crystalline tip, wherein the tip is not epitaxial to the substrate and wherein an axis of the tip forms an angle with respect to a vertical axis that passes through the substrate.

16. The tip structure of claim 15, wherein the substrate has a plane surface.

17. The tip structure of claim 15, wherein one point of the substrate serves as a basis for at least two tips.

18. The tip structure of claim 15, wherein the tip has a shape that contains at least one step and two links, an axis of each subsequent link has a predetermined angle with respect to an axis of a previous link.

19. The tip structure of claim 18, wherein at least one step serves as a basis for two links, and wherein at least one of the links is not epitaxial to the previous one.

20. The tip structure of claim 18, wherein at least one of the links is formed by a nanotube.

21. The tip structure of claim 20, wherein the nanotube is formed by layers of different materials, one of the materials being carbon.

22. The tip structure of claim 18, wherein at least one of the links is formed by at least one atomic row.

23. The tip structure of claim 15, wherein at least one tip has a particle on a top that contains, in addition to a material of the tip, at least one more chemical element, and wherein the particle is coated by a film of the chemical element.

24. The tip structure of claim 23, wherein at least one chemical element, that is contained in the particle, participates in a growing of the tip structure, and the particle can be coated by a film of a different chemical element.

25. The tip structure of claim 15, wherein a non-magnetic tip has a flat top, wherein a monodomenic magnetic particle of a conical shape is placed on the flat top, and wherein a basis of the particle contacts the flat top.

26. The tip structure of claim 15, wherein an electroconductive tip has a flat top perpendicular to an axis of the tip, wherein the flat top is coated by a dielectric film, and wherein a p-n junction in an upper part of the tip is parallel and close to the flat top.

27. A tip structure for an electron emissive device or a scanning probe device, comprising a substrate and a single-crystalline tip, wherein the tip is not epitaxial to the substrate, wherein a single-crystalline tip epitaxial to a plane single-crystalline surface serves as the substrate.

* * * * *